US008135582B2

(12) United States Patent
Suraqui

(10) Patent No.: US 8,135,582 B2
(45) Date of Patent: Mar. 13, 2012

(54) KEYBOARD SYSTEM AND METHOD FOR GLOBAL DISAMBIGUATION FROM CLASSES WITH DICTIONARY DATABASE FROM FIRST AND LAST LETTERS

(76) Inventor: Daniel Suraqui, Jerusalem (IL)

( * ) Notice: Subject to any disclaimer, the term of this patent is extended or adjusted under 35 U.S.C. 154(b) by 267 days.

(21) Appl. No.: 12/626,956

(22) Filed: Nov. 30, 2009

(65) Prior Publication Data

US 2011/0082686 A1    Apr. 7, 2011

Related U.S. Application Data

(60) Provisional application No. 61/243,539, filed on Oct. 4, 2009.

(51) Int. Cl.
*H03M 11/04* (2006.01)
*G06F 17/20* (2006.01)
*G06F 3/023* (2006.01)

(52) U.S. Cl. ............. 704/10; 341/22; 345/168; 715/263

(58) Field of Classification Search .................. 704/1, 3, 704/9, 10; 345/168; 382/231; 715/256, 715/257, 259, 263; 341/22
See application file for complete search history.

(56) References Cited

U.S. PATENT DOCUMENTS

| | | | | |
|---|---|---|---|---|
| 4,783,645 A * | 11/1988 | Goldwasser et al. | ............ | 341/22 |
| 6,286,064 B1 * | 9/2001 | King et al. | .............. | 710/67 |
| 6,597,345 B2 * | 7/2003 | Hirshberg | ................. | 345/168 |
| 7,081,837 B2 * | 7/2006 | Bollman | ................. | 341/22 |
| 7,091,885 B2 * | 8/2006 | Fux et al. | ................. | 341/22 |
| 7,098,896 B2 * | 8/2006 | Kushler et al. | ................ | 345/168 |
| 7,143,043 B1 * | 11/2006 | Vandermeijden | ............ | 704/275 |
| 7,199,786 B2 * | 4/2007 | Suraqui | ................. | 345/168 |
| 7,382,358 B2 * | 6/2008 | Kushler et al. | ................ | 345/168 |
| 7,385,591 B2 * | 6/2008 | Goodman | ................. | 345/172 |
| 7,387,457 B2 * | 6/2008 | Jawerth et al. | ................ | 400/489 |
| 7,453,439 B1 * | 11/2008 | Kushler et al. | ................ | 345/168 |
| 7,508,324 B2 * | 3/2009 | Suraqui | ................. | 341/22 |
| 7,706,616 B2 * | 4/2010 | Kristensson et al. | ......... | 382/187 |
| 7,758,264 B2 * | 7/2010 | Jawerth et al. | ................ | 400/489 |
| 2004/0104896 A1 * | 6/2004 | Suraqui | ................. | 345/168 |
| 2004/0120583 A1 * | 6/2004 | Zhai | ................. | 382/229 |
| 2005/0216278 A1 * | 9/2005 | Eisen | ................. | 705/1 |
| 2008/0138135 A1 * | 6/2008 | Gutowitz | ................. | 400/486 |
| 2009/0077464 A1 * | 3/2009 | Goldsmith et al. | ............ | 715/257 |
| 2010/0174529 A1 * | 7/2010 | Bradford et al. | ................ | 704/10 |
| 2011/0035209 A1 * | 2/2011 | Macfarlane | ................ | 704/9 |

* cited by examiner

*Primary Examiner* — Martin Lerner
(74) *Attorney, Agent, or Firm* — Haim M. Factor

(57) ABSTRACT

A reduced keyboard system for text input comprising: a first keyboard having a first plurality of keys, the keys being adapted to be keystroked for input of a word; a virtual keyboard having a plurality of virtual keys, the plurality of virtual keys corresponding respectively to the first plurality of keys and wherein the virtual keyboard is adapted to generate a linear pattern from the keystroked keys of the first keyboard; and a dictionary database associated with the virtual keyboard, the dictionary database having a plurality of classes wherein each of the classes contains at least one candidate word having first and last letters corresponding to predetermined keys of the virtual keyboard, wherein the linear pattern and dictionary database are adapted to enable recognition and disambiguation of the inputted word.

19 Claims, 4 Drawing Sheets

KEYBOARD SYSTEM AND METHOD FOR GLOBAL DISAMBIGUATION FROM CLASSES WITH DICTIONARY DATABASE FROM FIRST AND LAST LETTERS

This application claims priority from U.S. Provisional Application No. 61/243,539, filed Oct. 4, 2009, whose disclosure is incorporated herein by reference.

FIELD AND BACKGROUND OF THE INVENTION

The present invention relates generally to the field of mobile and handheld electronic devices. More specifically, embodiments of the present invention relate to a reduced keyboard system and method that is useful for all types of electronic devices that employ text input.

In the specification and the claims, which follow herein the terms "keyboard" and "keypad" are intended to mean a grouping of individual keys, as known in the art, used primarily for text input. "Reduced keyboard" and/or "reduced keypad", as used hereinbelow in the specification and the claims, are intended to mean a keyboard and/or a keypad having reduced dimensions, such as found in, but not limited to, handheld electronic devices. "Character", as used hereinbelow in the specification and the claims, is intended to mean generally a symbol or a letter—in contradistinction to a digit. When used in the context of describing a word (such as, but not limited to: "character in a word") the intention is a letter in the alphabet (in an alphabet-based language) or a component symbol (in a language having symbols which make up words).

Text entry for mobile and handheld devices represents a field that is developing at a very fast pace. With the continuously decreasing size of PDA's and similar devices, a major challenge of text entry has been the need for a compact keyboard that does not compromise the input speed or accuracy of the system. Typically, devices that have built-in hardware keyboards do not allow for fast text input, since individual keys on the keyboard are very small. Hand-writing recognition systems are highly dependent on the handwriting input quality and do not provide the desired level of speed and accuracy.

The use of keyboards having multiple characters on each key to reduce the overall size of the keyboard is known. Grover et al. in U.S. Pat. No. 5,818,437, whose disclosure is incorporated herein by reference, is among one of many publications which describes a reduced keyboard disambiguating computer, the keyboard having 12 keys, 9 of them labeled with numerous letters and other symbols. Grover describes, inter alia, how the keyboard disambiguating computer is used to process a keystroke sequence with a complete dictionary, and words which match the sequence of keystrokes are presented to the user in order of decreasing frequency of use. The user selects the desired word.

Other examples employing a keyboard having 12 keys include U.S. Pat. No. 6,307,548 and 549 to Flinchem et al. and King et al, respectively, whose disclosures are incorporated herein by reference, relate to a reduced keyboard disambiguating system having a keyboard with a reduced number of keys. A plurality of letters and symbols are assigned to a set of data keys so that keystrokes entered by a user are ambiguous. Due to the ambiguity in each keystroke, an entered keystroke sequence could match a number of words having the same number of letters. Each object is also associated with a frequency of use. Objects within the vocabulary modules that match the entered keystroke sequence are identified by the disambiguating system. Objects associated with a keystroke sequence that match the entered keystroke sequence are displayed to the user in a selection list.

The patents referenced hereinabove are related to a disambiguating input tool for handheld devices, known as the T9 system—initially developed by Tegics, San Diego, Calif. T9 has been embedded in many handset devices worldwide. Features of the T9 are described by Grover, Flinchem, and King, inter alia. The T9 system is simple and easy to implement. With the advent of touchscreen handset devices, the so-called XT9 keyboard was developed by Nuance, Boston, Mass.

Reference is now made to FIG. 1 which is a representation of a typical keypad 10, having individual keys 12. The idea behind the T9 system is simple and easy to implement. The keypad used has a total of twelve keys 12, among which eight are active keys, each of the eight keys having three or four characters 14 and a key-associated digit 16. In the specification and the claims which follow hereinbelow, the terms such as:"T9 keypad"; "T9 handset"; "8-key keyboard"; and "T9 arrangement" are used to mean a keypad configuration substantially as shown in FIG. 1.

In representing words using the handset of FIG. 1, a word or part of words in a dictionary can be labeled with the associated numbers. A word or sub-word composed of "n" characters is therefore labeled with "n" digits. When a user presses keys in a T9 handset to input a word, the sequence of keys he presses corresponds to a representative number, whose magnitude also reflects the number of keys pressed. After each keystroke, and until a key space or other disambiguation key is pressed, the system identifies in its dictionary for all the words or part of words associated with the equivalent number. The system sorts those words according to their frequency of use, starting with the highest frequency of use. As noted hereinabove, variants of this T9 algorithm are known in the art and they share a similar principle of disambiguation.

Suraqui (the Inventor of the present patent application) in U.S. Pat. No. 7,199,786, Kushler et al. in U.S. Pat. No. 7,098,896, and Zhai, in U.S. Pat. No. 7,251,367, whose disclosures are incorporated herein by reference, all discuss the concept of using a sliding motion to generate a bi-directional trajectory, thereby allowing the recognition of an inputted word. Methods and systems of inputting alphabetic text having a virtual keyboard on a touch-sensitive screen are also described. The virtual keyboard includes a set of keys where an each letter of alphabet is associated with at least one key, allowing a user to use the virtual keyboard with continuous contact of the touch sensitive screen. The user traces an input pattern for words by starting at or near the first letter in a decided word and then tracing through or near each letter in sequence. Then the system generates a list of possible words associated with the entered word/part of word and a list of candidate words is generated and presented to the user for selection.

While the prior art includes disambiguation methods most especially related to individual keystrokes and performing disambiguation by taking into account each individual pressed, there is a need for systems and methods to allow disambiguation not based on this method. The systems and methods should enable high-speed and accurate automatic disambiguating capabilities using text input in a relatively compact keyboard, thus allowing the use of a single disambiguation engine, whether the keyboard is virtual or "hard".

SUMMARY OF THE INVENTION

According to the teachings of the present invention there is provided a reduced keyboard system for text input comprising: a first keyboard having a first plurality of keys, the keys being adapted to be keystroked for input of a word; a virtual keyboard having a plurality of virtual keys, the plurality of virtual keys corresponding respectively to the first plurality of keys and wherein the virtual keyboard is adapted to generate a linear pattern from the keystroked keys of the first keyboard; and a dictionary database associated with the virtual keyboard, the dictionary database having a plurality of classes wherein each of the classes contains at least one candidate word having first and last letters corresponding to predetermined keys of the virtual keyboard, wherein the linear pattern and dictionary database are adapted to enable recognition and disambiguation of the inputted word. Preferably, the virtual keyboard has a linear configuration. Most preferably, at least one of the first plurality of keys contains at least two letters and one digit. Typically, the linear pattern has a linear pattern length and the linear pattern comprises at least one path derived from sequentially keystroked keys, the at least one path having a path length. Most typically, words belonging to a specific class of the dictionary database are ordered according to linear pattern length.

Preferably, at least one filter is operable to reduce the number of candidate words. Most preferably, the filter comprises a means for determining linear pattern length of candidate words and the inputted word. Typically, the filter comprises a means for determining the greatest path length of candidate words and the inputted word. Most typically, the filter comprises a means for determining the inflection point distribution for substantially each possible intermediate letter of candidate words and the inputted word. Preferably, the filter comprises a means for determining a global algebraic distance for each possible intermediate letter of candidate words and the inputted word. Most preferably, a recognition engine is applicable to compare the input word with candidate words selected after filtering. Typically, the first plurality of keys has an arrangement of keys chosen from the list including: alphabetic, QWERTY, and T9.

According to further teachings of the present invention there is provided a method for using a reduced keyboard for text input comprising the steps of: taking a first keyboard having a first plurality of keys and keystroking the keys for input of a word; configuring a virtual keyboard having a plurality of virtual keys, the plurality of virtual keys corresponding to the first plurality of keys, respectively; using the virtual keyboard to generate a linear pattern from the keystroked keys of the first keyboard; and associating a dictionary database with the virtual keyboard, the dictionary database having a plurality of classes wherein each of the classes contains at least one candidate word having first and last letters corresponding to predetermined keys of the virtual keyboard; and using the linear pattern and dictionary database to enable recognition and disambiguation of the inputted word. Preferably, the virtual keyboard has a linear configuration. Most preferably, at least one of the first plurality of keys contains at least two letters and one digit. Typically, the linear pattern has a linear pattern length and the linear pattern comprises at least one path derived from sequentially keystroked keys, the at least one path having a path length. Most typically, words belonging to a specific class of the dictionary database are ordered according to linear pattern length.

Preferably, at least one filter is used to reduce the number of candidate words. Typically, a recognition engine is applicable to compare the input word with candidate words selected after filtering. Most typically, the first plurality of keys has an arrangement of keys chosen from the list including: alphabetic, QWERTY, and T9.

BRIEF DESCRIPTION OF THE DRAWINGS AND APPENDICES

The invention is herein described, by way of example only, with reference to the accompanying drawings, wherein.

The invention is herein further described, by way of example only, with reference to the accompanying appendices, wherein:

APPENDIX 1 is the pseudo code corresponding to the disambiguation process;

APPENDIX 2 is the pseudo code corresponding to the prediction storage solutions; and APPENDIX 3 is the pseudo code corresponding to the prediction process.

DETAILED DESCRIPTION OF THE PREFERRED EMBODIMENTS

Figure 1:
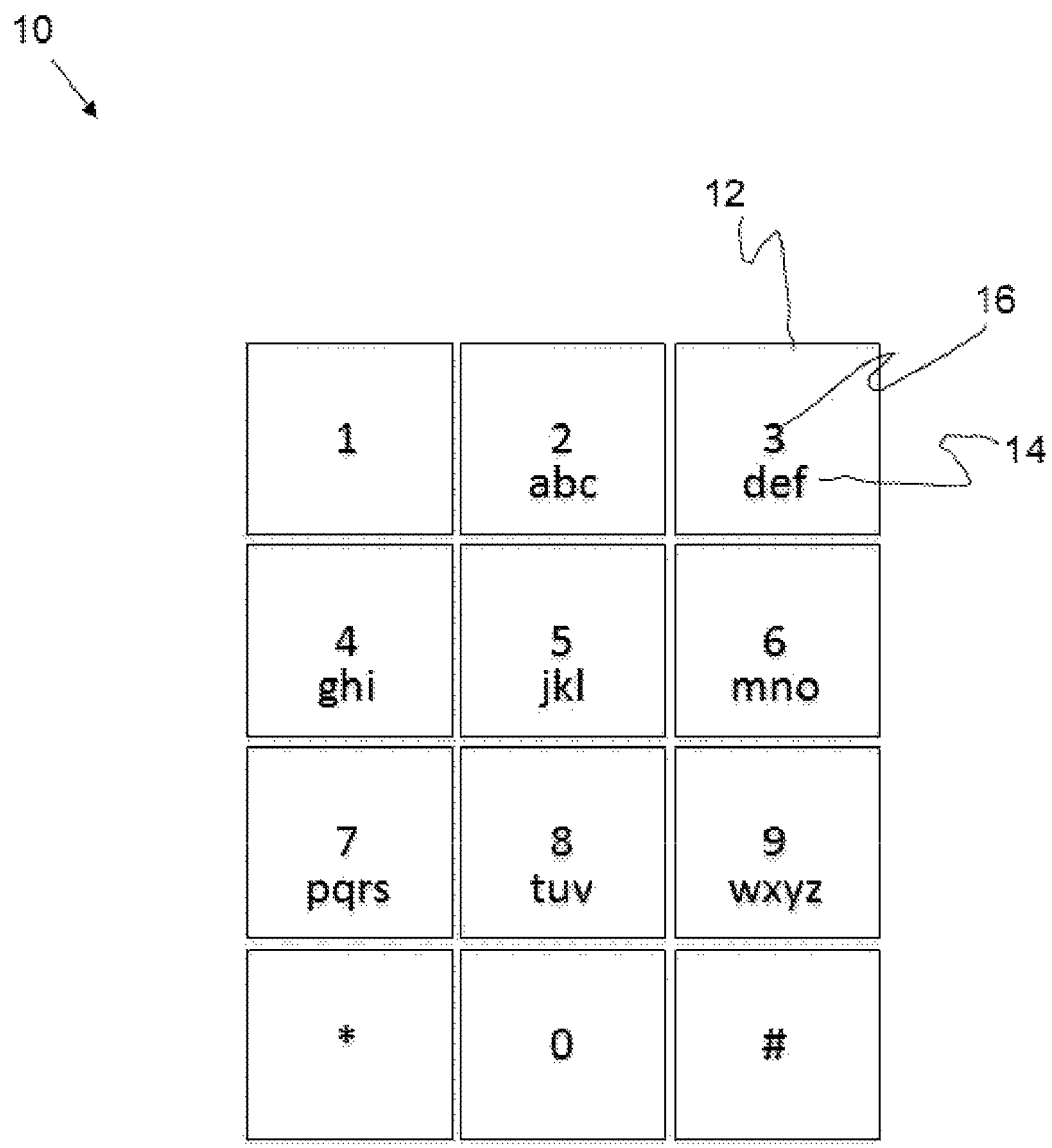
FIG. 1 is a representation of a typical keypad having individual keys.
Figure 2:
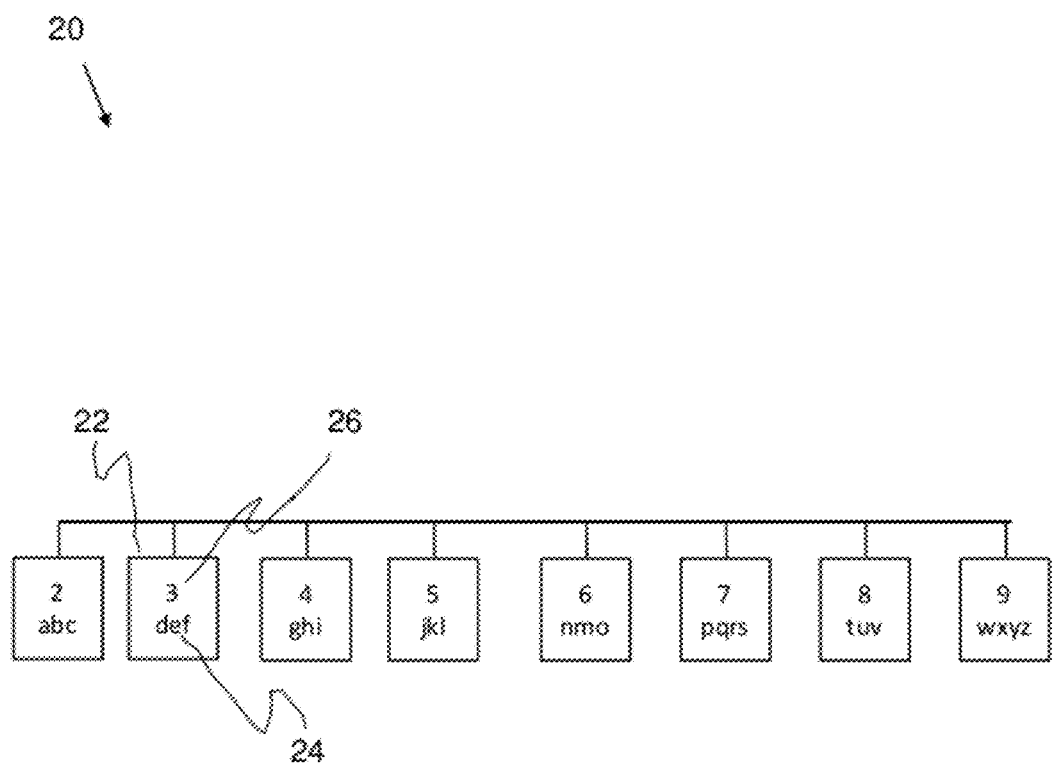
FIG. 2 is a representation of a virtual linear keypad, based upon the keypad of FIG. 1, in accordance with an embodiment of the current invention.

Reference is presently made to FIG. 2, which is a representation of a virtual keypad 20, corresponding to the keypad of FIG. 1, in accordance with an embodiment of the current invention. As can be seen in the figure, virtual keypad 20 has 8 keys with each key having a plurality of letters 24. Each key also has a digit 26. Letters 24 and digit 26 likewise correspond to characters 14 and a key-associated digit 16, respectively, as shown in FIG. 1.

In the specification and the claims which follow hereinbelow, the terms "linear configuration", "one-dimensional", and "horizontal" when used in reference to a virtual keypad or virtual keyboard, are meant to be any orientation of keys that can describe a continuous line. The virtual keypad shown in FIG. 2 has a linear or horizontal configuration. A straight line is a prominent example of a linear configuration and this configuration is a preferred embodiment of the current invention.

The keys shown in FIG. 2 are arranged in alphabetic order, however any other linear configuration of the keys, such as but not limited to, QWERTY fall in the scope of embodiments of the present invention. The total number of characters shown on the keys in FIG. 2 is 26; however embodiments of the present invention allow for languages having more or less than 26 alphabetic characters. Each of the keys in FIG. 2 has three characters, with the exception of keys having the digits "7" and "9", which have four characters each. Embodiments of the current invention include other numbers of characters per keys and other combinations of numbers, so that the virtual keyboard corresponds to a real keypad such as, but not limited, to the keypad of FIG. 1.

The correspondence of virtual keypad 20 (FIG. 2) to keypad 10 (FIG. 1) enables an effective transformation of a series of physical keystrokes on keypad 10 to a one-dimensional series of keystrokes on virtual keypad 20. This transformation is further commented upon hereinbelow.

The following terms used in the specification and the claims which follow hereinbelow are now defined:

"Linear pattern" is intended to mean the result of keystrokes of a series of keys, obtained from the linear configuration virtual keypad. Typically, the linear pattern is derived from a series of keys entered in an attempt to enter a word.

"Abscissa value" is a numerical value assigned to an individual key in the virtual keyboard. The abscissa value also indicates an absolute spatial position of the key. Because embodiments of the current invention take advantage of a one-dimensional linear pattern, the expression "abscissa value" used hereinbelow is also interchanged with the shortened expression "abscissa".

"Path" when applied to a keystroke sequence as viewed on a virtual linear keyboard, is intended to mean the virtual line connecting two sequentially keystroked keys. A path has an associated "path length" or "path length value".

"Linear pattern length" is intended to mean a resultant value obtained from summing the absolute (or the square) path values associated with each of the series of keys making up the linear pattern.

In other words, when a series of keystrokes is entered on keypad 10, a linear pattern is obtained from keypad 20. The linear pattern has a linear pattern length made up of the sum of the path lengths between all of the individual keys entered.

Figure 3:
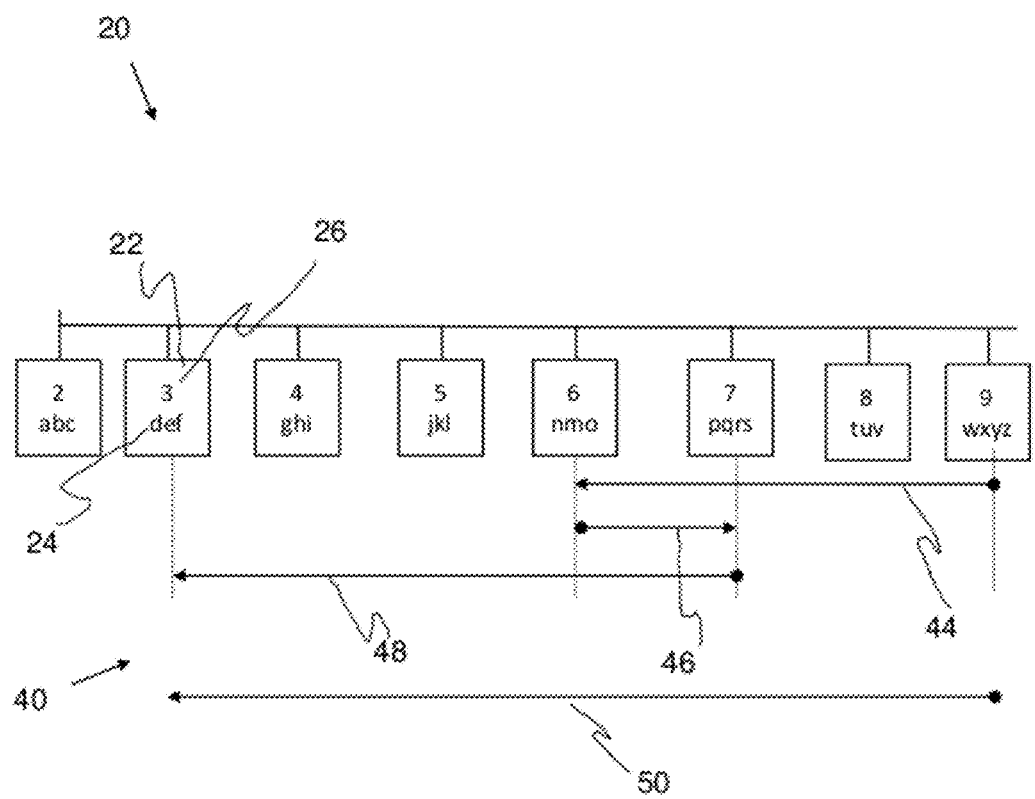
FIG. 3 is a representation of linear keyboard and a linear pattern of the word "word" created by keystroking keys, in accordance with an embodiment of the current invention.

Reference is presently made to FIG. 3, which is a representation of the one-dimensional virtual keyboard 20 of FIG. 2 and a linear pattern 40 of the word "word" created by keystroking keys, in accordance with an embodiment of the current invention. Linear pattern 40 is composed of three paths: 44, 46, and 48.

As noted hereinabove, each of the 8 keys of the virtual keyboard is assigned an abscissa value. Exemplary values are: 0, 11, 31, 63, 104, 154, 215 and 286, respectively. These exemplary values have been computed for letters of the English language to minimize the number of words having the same linear pattern length. A further discussion of this calculation is given hereinbelow under the discussion of inflection point distribution.

As an example, the linear pattern length of the word "word" is the summation of the path lengths of path 44 (from the keys having "w" to "o"), path 46 (from the keys having "o" to "r"), and path 48 (from the keys having "r" to "d"). Therefore, the linear pattern length—which is called LEN1_INP_PAT hereinbelow—of the keystroke sequence corresponding to the word "word" is:

$$LEN1\_INP\_PAT = (286-104)^{}2 + (104-154)^{}2 + (154-11)^{**}2 = 56,073$$

Once a linear pattern is obtained from keystrokes (as described hereinbelow) a dictionary is used to filter candidate words as part of the disambiguation process. One possibility of a dictionary is a dictionary database (or simply "dictionary") with the dictionary having classes, as described hereinbelow. The dictionary size is determined according to the number of keys in keyboard, also as described hereinbelow. The dictionary is arranged according the first and last letter of a word.

The word "class" when used in the specification and the claims which follow hereinbelow is intended to mean all of the words of a dictionary which have in common the first and the last letters of a word, the letters corresponding to a given key on a keypad. As an example, applied to T9 keyboard, the word "word" belong to the class of all the words in the dictionary in which the first letter is: "w", "x", "y", or "z", and last letter is "d", "e" or "f".

Generally, the number of classes in the dictionary is the square of the number of keys having letters. In an embodiment of the present invention employing the T9 keyboard the number of classes is 8×8=64. For a 13-key keyboard (typically two characters per key) there are 13×13 or 169 classes. For a 26-key keyboard, typically having a single character per key, there are 26×26=676 classes.

Within each class, words are sorted according their respective linear pattern lengths and embodiments of the present invention incorporate additional sorting, hereinbelow referred to as "filtering", as part of the word disambiguation method/process. The process of filtering, when taking advantage of a linear path or similar result of a grouping of keystrokes is referred in the specification and the claims which follow herein as "global filtering"—in contradistinction to "local filtering", which is typically performed on individual keystrokes.

A disambiguation process of Suraqui (786) is briefly described hereinbelow, followed by a description of an embodiment of the current invention for a disambiguation method for an 8-key keyboard.

According to Suraqui (786), when the user has completed keystrokes for a word input, a so-called "virtual trajectory" is generated by the system. The vicinity of the first point "coordinate" of the virtual trajectory is inspected and all the characters on keys in the vicinity of the first point become suitable candidates for the first letter of the intended word. In a similar fashion, all characters in the vicinity of keys at the last point of the virtual trajectory are candidates for the last letter of the intended word. The dictionary is then scanned for words belonging to a relevant class. As an example, in a classic QWERTY keyboard, if the first point is in the vicinity of the keys having the letters "w" "e" "r" and the last point close to keys having the letters "d" "c" the possible candidates are all words belonging to classes: "w-d" (i.e. the class in which all words start with "w" and terminate with "d"), "w-c", "e-d", "e-c", "r-c", and "r-d".

In an embodiment of the present invention, as opposed to a configuration having a touch-screen virtual keyboard, the keyboard has only 8 alphabetic-representation keys. The assumption applied to embodiments of the present invention is that there is no uncertainty as to the keystroked key. In other words the user always keystrokes the correct key. Neighboring keys are not considered, as, for example, is the case in a touch-screen virtual keyboard. Therefore, when keystroking is completed according to an embodiment of the current invention, all possible candidate words must belong to only one of the 64 possible classes described hereinabove. In the example of the word "word", the corresponding class is defined by the key having the digit "8" for the first letter of the word and by the key having the digit "3" for the last letter.

In the specification hereinbelow and in the claims which follow, the term "input word" or simply "input" is intended to mean the word represented by the sequence of keystrokes obtained from the virtual keypad of FIG. 2 and FIG. 3. The global filtering and disambiguation processes, as described hereinbelow, are performed by using the "input" and by comparing it against dictionary words (also referred to hereinbelow simply as "candidate word" or "candidate words") until, very few or, ideally, only one word remains—the disambiguated word(s).

Each time a key is keyed and a linear pattern—and an associated linear pattern length—is generated and the class is determined—as described hereinabove—a robust filtering process is necessary to eliminate as many wrong candidate words as possible and thereby to enhance the disambiguation process. Exemplary filters are discussed hereinbelow.

Linear Pattern Length

A straightforward global filter is when the input linear pattern length is compared with linear pattern lengths of the candidate words in a given class. If a candidate word has a linear pattern length value different than the input linear pattern length, the candidate word is eliminated as part of the disambiguation process. In the 8-key keyboard with the assumption of no errors in keystrokes, only the candidate words having exactly the same linear pattern are selected and all the others are rejected. Individual classes can be sorted, for example, according to increasing linear pattern lengths. The filtering process is very fast because the dictionary search stops when the first word linear pattern is greater than the length of the input pattern. In a similar way, if classes are sorted according to decreasing linear pattern length, the filtering process is likewise fast, mutatis mutandis.

Largest Linear Path Length

The largest linear path length is the path length between the two most extreme located keys/characters on the virtual keyboard of the input word. In the case of a virtual linear keyboard this is the distance between the right-most and left-most keys of the word—i.e. "largest path length" or "maximum path length".

The largest linear path length of a class is compared with the other class linear path lengths. When the linear path length of a given class is below or above one or more thresholds, the word is eliminated.

In an embodiment of the current invention, only the word candidates having exactly the same largest path lengths are selected. In the keyboard of FIG. 3, the exemplary largest path length (corresponding to the word "word") is seen as the path length between the two keys having the digits "9" and "3". Computation of the largest path length is straightforward, as follows:

highest abscissa value−lowest abscissa value

Where "highest" typically refers to the abscissa of the right-most key and "lowest" refers to the abscissa of the left-most key.

The following symbols are defined for the examples hereinbelow:

LEN2_DIC is the input largest path length of a candidate word; and

LEN2_INP_PAT is the maximum path length of the input word. To further amplify this point, referring to FIG. 3 and considering the word "word". The largest or maximum path length is identified as path 50, which is the distance from the character located at the extreme right ("w") to the character located at the extreme left ("d"). Therefore:

LEN2_INP_PAT=286 (abscissa of key 9)−11 (abscissa of key 3)=275

Global Algebraic Distance

Another filter that may be applied is similar to that of the linear path length. The global algebraic distance represents the algebraic sum (as opposed to the absolute value sum) of the paths. This sum is indicated by the term "LEN3_INP_PAT" and it is defined as follows:

$$\text{LEN3\_INP\_PAT} = \sum_{i=j}^{n-j}(x_{i+1} - x_i)$$

Where n is the number of letters

Where $X_i$ is the abscissa corresponding to the $i^{th}$ keystroke.

When the first and last character keys are different: j=1,

When the first and last character keys are identical j=2,

When j=2 and the second character key is the same key of the before last character key j=3; etc. This arrangement is done to discriminate among palindrome words.

For example, using the word "word", refer to FIG. 3, the global algebraic distance for an input word is:

From "w" to "o" 104−286=−182

From "o" to "r" 154−104=50

From "r" to "d" 11−154=−143

Therefore, LEN3_INP_PAT=−182+50−143=−275.

Note that the value obtained in this case is negative, reflecting an algebraic summation, as opposed to an absolute value summation.

Inflection Point Distribution

In a linear pattern, considering 2 sequential keystrokes, a corresponding "inflection parameter" or "inflection point" are defined, having three possible states:

when a keystroked key is the same as the previously keystroked key, there is no inflection and the inflection parameter has a value of 0;

when the keystroked key is located to the right of the previously keystroked key, the corresponding "angle" is 0 degrees and the inflection parameter has a value of 1; and when the keystroked key is located to the left of the previously keystroked key, the corresponding "angle" is 180 degrees and the inflection parameter is defined as 2.

Therefore for a word composed of "n" characters there are n-1 digits being 0, 1, or 2 which define the inflection point distribution. Let's define:

LEN4_DIC the inflection point distribution for a candidate word; and

LEN4_INP_PAT the inflection point distribution for the input word.

As an example for the word "word" the inflection point distribution is LEN4_INP_PAT =212. (From "w" to "o" we get 2 (right-lefty). From "o" to "r" we get 1 (left-right) from "r" to "d" we get 2 (right-left). For n keystrokes, LEN4_INP_PAT is composed of n−1 digits. Every time that LEN4_DIC is different than LEN4_INP_PAT the candidate word is eliminated.

The filters described hereinabove are exemplary filters which can be used in embodiments of the current invention. Additional or alternative global filters can likewise be applied in embodiments of the present invention.

As noted hereinabove abscissa values of the 8 keys are respectively: 0,11,31,63,104,154,215 and 286. These abscissa values are computed to minimize the couples of words (or part of words) which correspond to a different sequence of keystrokes but nevertheless having the same linear pattern. This set of values is not unique and it was computed for the English language. For another language a different set of values may need to be recomputed.

As an example with an English dictionary composed of about 45,000 words and using the filters LEN1_DIC, LEN2_DIC, LEN3_INP_PAT and LEN4_INP_PAT which are defined hereinabove and considering all the words or part of the words of the dictionary, there are only 25 ambiguities related to entire words and which are listed below.

| WORD-1 | Key value | WORD-2 | Key value |
|---|---|---|---|
| finish | 235363 | firing | 236353 |
| regard | 623162 | repaid | 626132 |
| cleared | 1421622 | creaked | 1621422 |
| flames | 241526 | docker | 251426 |
| drawer | 261826 | dwarfs | 281626 |
| clearer | 1421626 | breaker | 1621426 |
| treaties | 76217326 | theatres | 73217626 |
| brands | 161526 | arenas | 162516 |
| newbury | 5281768 | newquay | 5286718 |
| Finnish | 2355363 | dipping | 2366353 |
| firmer | 236526 | forges | 256326 |
| creams | 162156 | broads | 165126 |
| dwarfs | 281626 | frazer | 261826 |
| Goodman | 3552515 | immanen(t) | 3551525 |
| Bodice | 152312 | agence | 132512 |
| cranes | 161526 | arenas | 162516 |
| uniting | 7537353 | uniniti(iated) | 7535373 |
| foreword | 25628562 | empowere(d) | 25658262 |
| crayons | 1618556 | crowbar | 1658116 |
| arenas | 162516 | Cramer | 161526 |
| haldane | 3142152 | gandalf | 3152142 |
| herbie | 326132 | hardie | 316232 |
| Uranus | 761576 | toasts | 751676 |
| donating | 25517353 | dominati(on) | 25535173 |
| empower | 2565826 | forewor(d) | 2562856 |

As an example, when a user keystrokes the word "treaties", which correspond to keystrokes on keys 8,7,3,2,8,4,3,7, one of the solutions he could receive is the word "theatres", which corresponds to keystrokes 8,4,3,2,8,7,3,7. This is a disambiguation failure, because in this case 2 words (or sub-words) having a different keystroke sequence were nevertheless labeled in the same group of solutions. However, there are only 25 such ambiguities.

Quite clearly, the above ambiguities are not meaningful. Furthermore, one or more additional global filters could reduce those ambiguities, but it is not practically required as far as the English language is concerned.

Furthermore, and ultimately, the recognition engine detailed in Suraqui (786), based on monotonous segment patterns or any other recognition engine can be applied to compare the input pattern with linear patterns of candidate words selected after filtering. All candidate solutions not having a perfect match should be eliminated thus entirely solving the ambiguities noted hereinabove.

Figure 4:
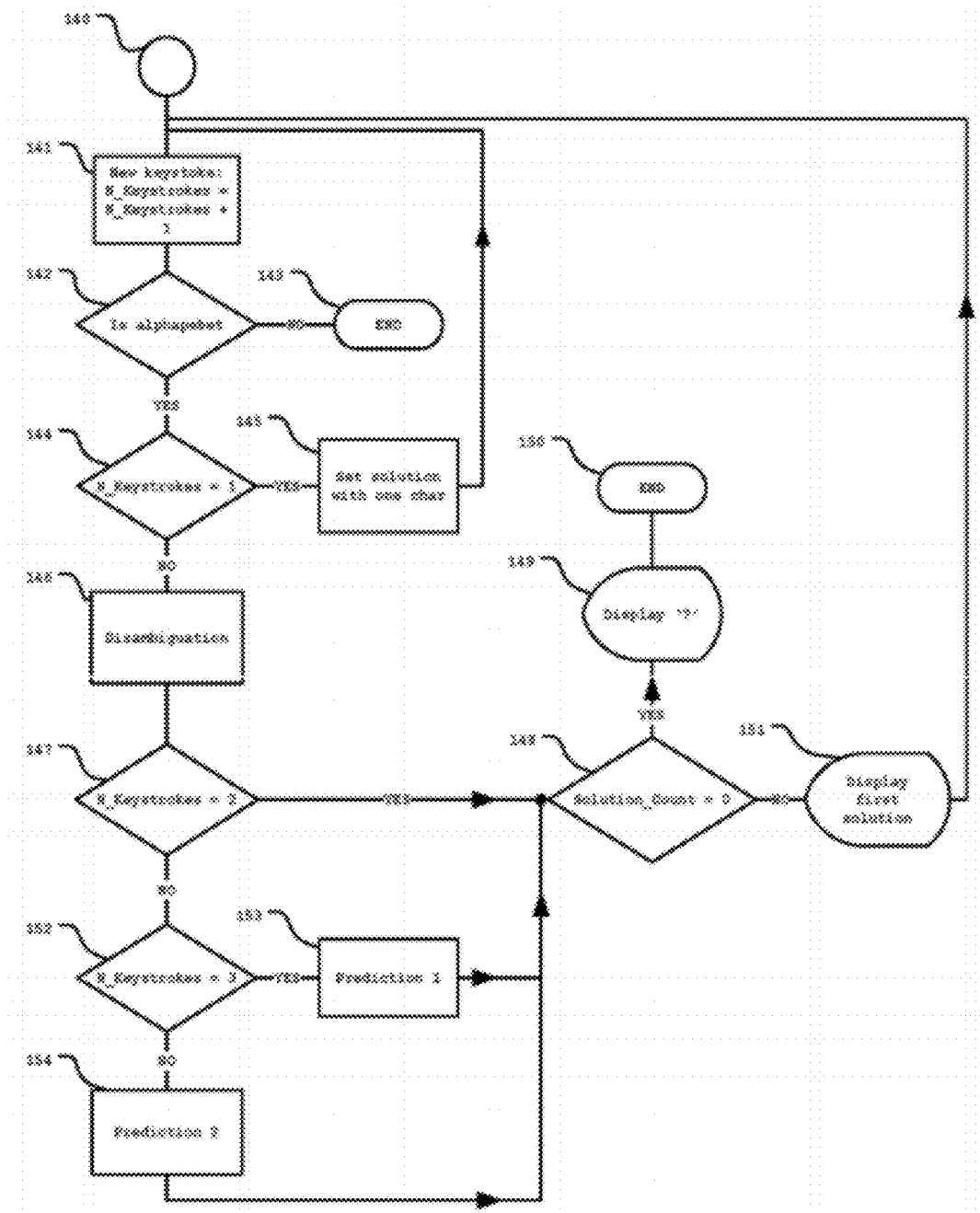
FIG. 4 is a flow chart illustrating a disambiguation and a prediction process, in accordance with an embodiment of the current invention.

Reference is now made to FIG. 4, which is a flow chart illustrating a disambiguation and a prediction process, in accordance with an embodiment of the current invention. At step 140 (start) the user keystrokes a key from the keyboard of FIG. 1. At step 141, the process increments the number of keystrokes, initially set to zero, by one. At step 142 when the keystroked key is a character key, this yields a corresponding keystroke on the corresponding key of the virtual keyboard of FIG. 2. When the keystroke is on a non-character key, step 143, the corresponding action associated with the non-character key (i.e. punctuation, space, alternative solutions, etc) is executed and the process is ended. At step 144, the number of letter keystrokes, initially set to zero, is incremented by one. In parallel, the 3 or 4 letters indicated on the keystroked key are stored and the highest frequency letter is displayed, step 145.

When the keystroke number of step 144 is greater or equal to 2, meaning "NO", the DISAMBIGUATION module (Appendix 1) is called in step 146. The DISAMBIGUATION module is detailed hereinbelow. The objective of the DISAMBIGUATION module is to scan all the words which belong to the class corresponding to the first and last keystrokes, to filter the solutions and to store the higher frequency solutions for possible display. When the keystroke number is equal to 2, step 147, the highest frequency solution is displayed, step 151. When there is no solution, step 148, meaning the answer to "solution_count=0" is YES, a question mark is displayed in step 149. When the keystroke number is equal to 3, step 152, the PREDICTION1 module (Appendix 2) is called in step 153. The objective of the PREDICTION1 module is to select all the candidate words having more than 3 letters; to compute LEN1_INP_PAT, LEN2_INP_PAT, LEN3_INP_PAT and LEN4_INP_PAT corresponding to the first 3 letters of the input word and to subsequently eliminate all the candidate words (LEN1_DIC, LEN2_DIC, LEN3_DIC, LEN4_DIC) for which the above parameters are not equal to the 3 first letters of the input word corresponding parameters. At this point, candidate words having exactly three characters have already been determined from the immediate previous pass in step 146. Candidate words from step 153 are then added to the candidate words from step 146 and all the candidate words are now sorted according to their highest frequency of use, with higher priority given to complete words having 3 letters (as opposed to words having more than 3 letters). Then, new solutions and the corresponding number of solutions ("Solution_Count") are updated in step 148. Additional information regarding the PREDICTION1 module is presented hereinbelow.

When the keystroke number is greater than 3 (i.e. 4 or more), step 154, the PREDICTION2 module (Appendix 3) is called. This module is called on when the keystroke number (J_TAP) is greater than or equal to 4. The objective of the PREDICTION2 module is to select among the WORDLIST vector all the candidate words having 4 letters or more and having parameters LEN1_DIC, LEN2_DIC, LEN3_DIC and LEN4_DIC identical to the corresponding input word parameters LEN1_INP_PAT, LEN2_INP_PAT, LEN3_INP_PAT (which by definition has J_TAP letters). Here too, as it was done in PREDICTION1 module, the solutions corresponding to the J_TAP keystrokes are a combination of predicted and disambiguated solutions. When J_TAP=4 a factor of 30 (see line 6.2.1. from Appendix 3) gives priority to the disambiguated solution, when J_TAP=5 this factor is 2 (line 6.3.1), when J_TAP>5, there is no prioritization. The reason for this is that only short words need to be prioritized. It is appreciated that the numbers used hereinabove are exemplary only and can be varied according the language and the size of the dictionary.

Consider now the DISAMBIGUATION module pseudo-code executed at step 146 and detailed in Appendix1 hereinbelow. This code is called at each virtual keyboard keystroke after the first keystroke. Its aim is to select full word solutions having the same number of letters (J_TAP) of the keystroked input word. The calculation loop is very straightforward. All the words belonging to the same class as the input word and having the same LEN1_DIC, LEN2_DIC, LEN3_DIC and LEN4_DIC as the input word parameters are selected solutions. Since the dictionary is sorted according to increasing linear pattern length, as noted hereinabove, the calculation loop is stopped when the first linear pattern length of a candidate word is greater than that of the input word. Additionally, since all words of a class having the same linear pattern are arranged according to decreasing frequency of use, no further sorting is necessary and the first selected solution will have the greatest frequency, the second the second largest frequency, etc.

Consider now the PREDICTION1 pseudo-code corresponding of step 153, and detailed in Appendix 2 hereinbelow. This code is called only at the third keystroke (J_TAP=3). Its objective is to store the future potential solutions corresponding to words greater than 3 letters in order to eventually retrieve words when the number of keystroked letters increases. The first loop (line 2 of Appendix 2) considers all 8 possible classes (i.e. the entire dictionary). All the candidate words for which the 3 first letters do not have the same LEN1_DIC, LEN2_DIC, LEN3_DIC and LEN4_DIC values compared to corresponding LEN1_INP_PAT, LEN2_INP_PAT, LEN3_INP_PAT and LEN4_INP_PAT of the input are eliminated. For each candidate word which is retained, solutions are stored in vectors: WORDLIST (selected word), LAST_LIST (number of characters), N_FREQ_LIST (frequency of use). Note that the required maximum storage is less than 2000 words, for a 45,000 English dictionary. This word storage number can be significantly larger for other languages; however whatever language is used, the system performs in real time for most current handset devices.

All the selected solutions are stored according their decreasing frequencies of use. In the subsequent keystrokes those stored vectors are used (by the PREDICTION2 module) to extract solution. Finally, PREDICTION1 yields a final solution at the third keystroke. Those solutions are a mixing of the disambiguated solutions corresponding to 3 characters words found by the DISAMBIGUATION module at step 146 and larger words which belong to the above stored list. However, to give a clear priority of solution to a 3-character candidate word solutions with respect to larger words, all the disambiguated frequency of use are multiplied by a factor of 100 (line 4.1.2, Appendix 2). As an example when the user keystrokes the word "inn" which corresponds to keys 4,6,6 on the keyboard of FIG. 2 he obtains following solution: inn, goo (from good), ion, goo, hon, etc. Although "inn" has a much lower frequency than "good" it nevertheless is the first solution, because "inn" is a full word, while "goo" is a prediction.

In addition to the exemplary global filters described hereinabove, embodiments of the current invention may likewise take advantage of the other virtual linear keyboard and local filters, as known in the art.

It will be appreciated that the above descriptions are intended only to serve as examples, and that many other embodiments are possible within the scope of the present invention as defined in the appended claims.

The invention claimed is:

1. A reduced keyboard system for text input comprising:
    a first keyboard having a first plurality of keys, the keys being adapted to be keystroked for input of a word;
    a virtual keyboard having a plurality of virtual keys, the plurality of virtual keys corresponding respectively to the first plurality of keys and wherein the virtual keyboard is adapted to generate a linear pattern from the keystroked keys of the first keyboard, wherein the linear pattern is formed exclusively of segments forming at least one corresponding angle, the corresponding angle having a value chosen from the list including zero and 180 degrees; and
    a dictionary database associated with the virtual keyboard, the dictionary database having a plurality of classes wherein each of the classes contains at least one candidate word having first and last letters corresponding to predetermined keys of the virtual keyboard,
    wherein the linear pattern and dictionary database are adapted to enable recognition and disambiguation of the inputted word.

2. The reduced keyboard system according to claim 1, wherein the virtual keyboard has a linear configuration.

3. The reduced keyboard system according to claim 2, wherein at least one of the first plurality of keys contains at least two letters and one digit.

4. The reduced keyboard system, according to claim 3, wherein the linear pattern has a linear pattern length and the linear pattern comprises at least one path derived from sequentially keystroked keys, the at least one path having a path length.

5. The reduced keyboard system according to claim 4, wherein words belonging to a specific class of the dictionary database are ordered according to linear pattern length.

6. The reduced keyboard system according to claim 5, wherein at least one filter is operable to reduce the number of candidate words.

7. The reduced keyboard system according to claim 6, wherein the filter comprises a means for determining linear pattern length of candidate words and the inputted word.

8. The reduced keyboard system according to claim 6, wherein the filter comprises a means for determining the greatest path length of candidate words and the inputted word.

9. The reduced keyboard system according to claim 6, wherein the filter comprises a means for determining the inflection point distribution for substantially each possible intermediate letter of candidate words and the inputted word.

10. The reduced keyboard system according to claim 6, wherein the filter comprises a means for determining a global algebraic distance for each possible intermediate letter of candidate words and the inputted word.

11. The reduced keyboard system according to claim 6, wherein a recognition engine is applicable to compare the input word with candidate words selected after filtering.

12. The reduced keyboard system according to claim 1, wherein the first plurality of keys has an arrangement of keys chosen from the list including: alphabetic, QWERTY, and T9.

13. A method for using a reduced keyboard for text input comprising the steps of:
    taking a first keyboard having a first plurality of keys and keystroking the keys for input of a word;
    configuring a virtual keyboard having a plurality of virtual keys, the plurality of virtual keys corresponding to the first plurality of keys, respectively;
    using the virtual keyboard to generate a linear pattern from the keystroked keys of the first keyboard, wherein the linear pattern is formed exclusively of segments forming at least one corresponding angle, the corresponding angle having a value chosen from the list including zero and 180 degrees; and
    associating a dictionary database with the virtual keyboard, the dictionary database having a plurality of classes wherein each of the classes contains at least one candidate word having first and last letters corresponding to predetermined keys of the virtual keyboard; and
    using the linear pattern and dictionary database to enable recognition and disambiguation of the inputted word.

14. The method for using a reduced keyboard according to claim 13, wherein the virtual keyboard has a linear configuration.

15. The method for using a reduced keyboard according to claim 14, wherein the linear pattern has a linear pattern length and the linear pattern comprises at least one path derived from sequentially keystroked keys, the at least one path having a path length.

16. The method for using a reduced keyboard according to claim 15, wherein words belonging to a specific class of the dictionary database are ordered according to linear pattern length.

17. The method for using a reduced keyboard according to claim 16, wherein at least one filter is used to reduce the number of candidate words.

18. The method for using a reduced keyboard according to claim 17, wherein a recognition engine is used to compare the input word with candidate words selected after filtering.

19. The method for using a reduced keyboard according to claim 13, wherein the first plurality of keys has an arrangement of keys chosen from the list including: alphabetic, QWERTY, and T9.

* * * * *